United States Patent
Ghanouni et al.

(10) Patent No.: US 7,204,650 B2
(45) Date of Patent: Apr. 17, 2007

(54) ACCESSORY ASSEMBLY FOR PHOTOGRAPHIC EQUIPMENT

(76) Inventors: Amir Saied Ghanouni, 2150 Palmer Pl., Tustin, CA (US) 92782; Katayoon Jam Ghanouni, 2150 Palmer Pl., Tustin, CA (US) 92782

(*) Notice: Subject to any disclaimer, the term of this patent is extended or adjusted under 35 U.S.C. 154(b) by 0 days.

(21) Appl. No.: 10/837,457

(22) Filed: Apr. 30, 2004

(65) Prior Publication Data

US 2004/0223752 A1  Nov. 11, 2004

Related U.S. Application Data

(60) Provisional application No. 60/467,962, filed on May 5, 2003.

(51) Int. Cl.
*G03B 17/56* (2006.01)

(52) U.S. Cl. .......................................... 396/420

(58) Field of Classification Search ................ 396/419, 396/420, 423, 425, 428; 352/243; 348/373–376, 348/143, 158

See application file for complete search history.

(56) References Cited

U.S. PATENT DOCUMENTS

| 4,327,986 A | * | 5/1982 | Carter ......................... 396/423 |
| 5,065,249 A | * | 11/1991 | Horn et al. .................. 348/376 |
| 6,712,322 B2 | * | 3/2004 | Nakatani .................. 248/187.1 |

* cited by examiner

*Primary Examiner*—W. B. Perkey
(74) *Attorney, Agent, or Firm*—Blakely, Sokoloff, Taylor & Zafman

(57) ABSTRACT

An embodiment of the invention is an accessory to hold a photographic equipment. The accessory includes an attachment assembly and an object. The attachment assembly attaches to the photographic equipment. The object is coupled to the attachment assembly to allow a user to control movement of the photographic equipment.

40 Claims, 8 Drawing Sheets

ACCESSORY ASSEMBLY FOR PHOTOGRAPHIC EQUIPMENT

RELATED APPLICATION

This application claims the benefits of the provisional application No. 60/467,962 filed on May 5, 2003 entitled "Adjustable Shaft".

BACKGROUND

1. Field of the Invention

Embodiments of the invention relates to the field of instrumentation, and more specifically, to accessories for photographic equipment.

2. Description of Related Art

Photographic or imaging equipment have become popular thanks to advances in imaging devices and electronic components. For example, video cameras have become lighter, smaller, and have higher resolutions. However, video recording or taking pictures of scenes, activities, or people has a number of problems. First, the person who does the recording or taking the picture may not be in the picture or the movie. Second, it may be difficult to point the camera at a particular viewing angle (e.g., above pointing downward).

Existing techniques include mounting the camera on a tripod or on some mechanically stable platform, or asking another person to control the camera. These techniques have a number of drawbacks. Leaving the camera on a fixed location like a tripod or a platform does not capture a moving scene or activities. People may get out of the field of view of the camera or moving away. Furthermore, there may not be space or mechanically stable platform. There may not be people around to ask for assistance and they may not be trustworthy. It is well known that travelers in foreign countries are easy targets for thefts or robberies.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is an accessory to hold a photographic equipment. The accessory includes an attachment assembly and an object. The attachment assembly attaches to the photographic equipment. The object is coupled to the attachment assembly to allow a user to control movement of the photographic equipment.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 1:
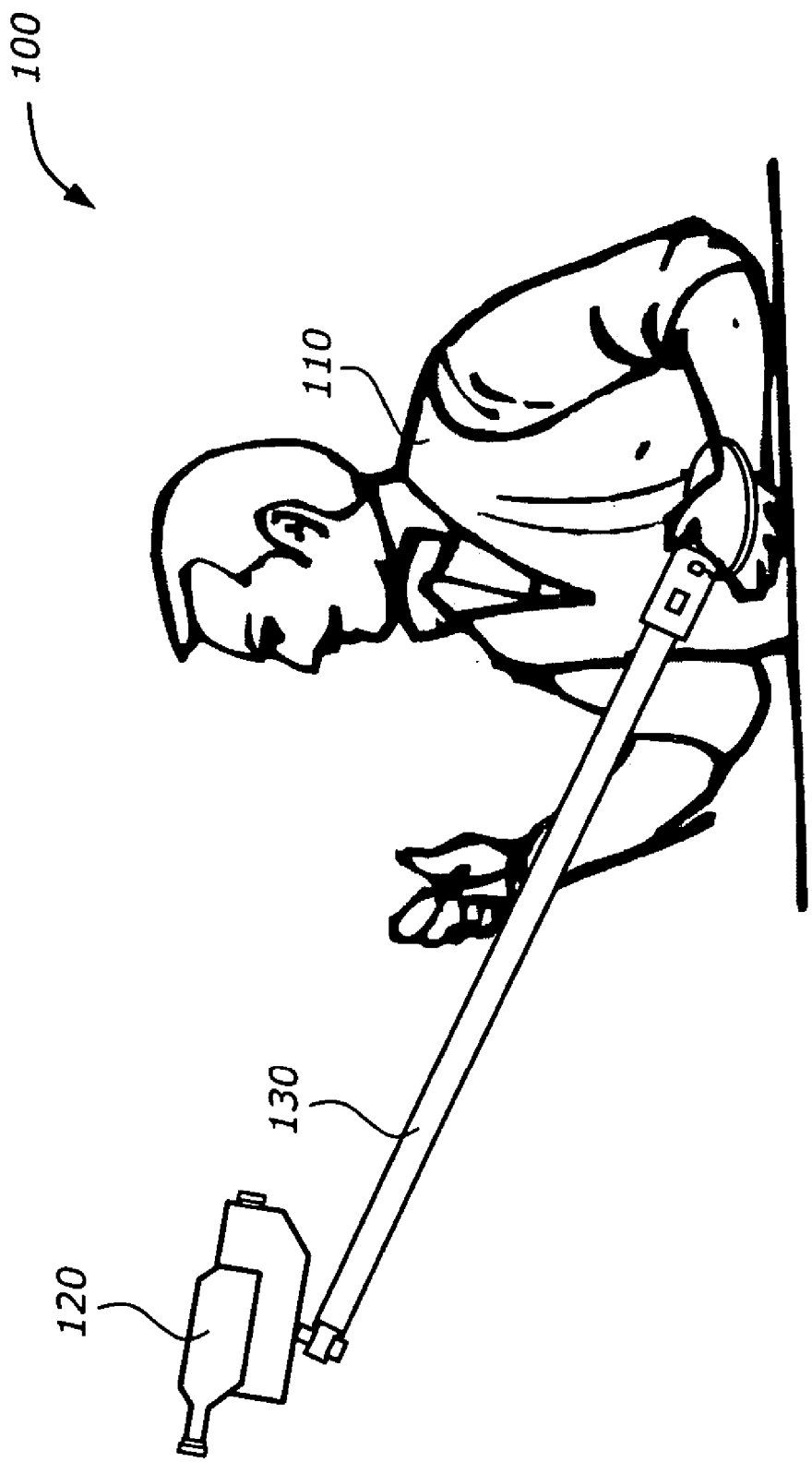
FIG. 1 is a diagram illustrating a system in which one embodiment of the invention can be practiced.

FIG. 1 is a diagram illustrating a system 100 in which one embodiment of the invention can be practiced. The system 100 includes a user 110, a photographic equipment 120, and a holding accessory 130.

The user 110 is any person who is using the photographic equipment to take pictures, conduct field work, recording actions or activities. The user 110 may be accompanied by other people in a group, such as family members. The user 110 wants to be able to control the photographic equipment such that he or she is also included in the video images or movies, or the equipment may be positioned at a desired viewing position.

The photographic equipment 120 is any imaging equipment or device that can take pictures, still images or cinematic sequence of images. It may be an analog or digital camera, camcorder, video recorder, cell phone camera, video camera using any imaging format (e.g., 8 mm, Hi8 mm, camera mobile phone, VHS, VHS-C, digital). The recording medium may be any medium including video tape, electronic medium, and digital versatile disk (DVD). It may have a remote control mechanism to allow the user 110 to remotely control the imaging functions such as zooming. It may have a display window that can be turned or flipped in any direction to allow the user 110 to view the scene before or during the video recording or picture taking. The photographic equipment 120 may include the holding accessory 130 fully or partly. The control functions to activate the equipment 120 to take picture, record sequences of images, record movies, zoom in/out, stop recording, etc. may be performed mechanically, electronically, or optically. These functions may be set in advance or activated while the user is holding the accessory 130.

The holding accessory 130 provides a means for the user 110 to hold or to secure the photographic equipment during picture taking or video recording. By holding or securing the photographic equipment with the holding accessory 130, the user 110 is able to take pictures or recording movies that include himself or herself in the field of view of the equipment 120, or position the equipment 120 to point to a desired viewing angle. In addition, the user 110 is able to move the photographic equipment 120 within a relative distance with him or her. The holding accessory 130 therefore provides convenience, freedom, and efficiency for the user 110. The holding accessory 130 may be a component separate from or fully or partly integrated with the photographic equipment 120. The holding accessory 130 may also include a control mechanism to activate the control functions of the equipment 120 to take picture, record video images, or zoom in/out. The control mechanism may be mechanical, electronic, electromagnetic (e.g., wireless), or optical.

Figure 2:
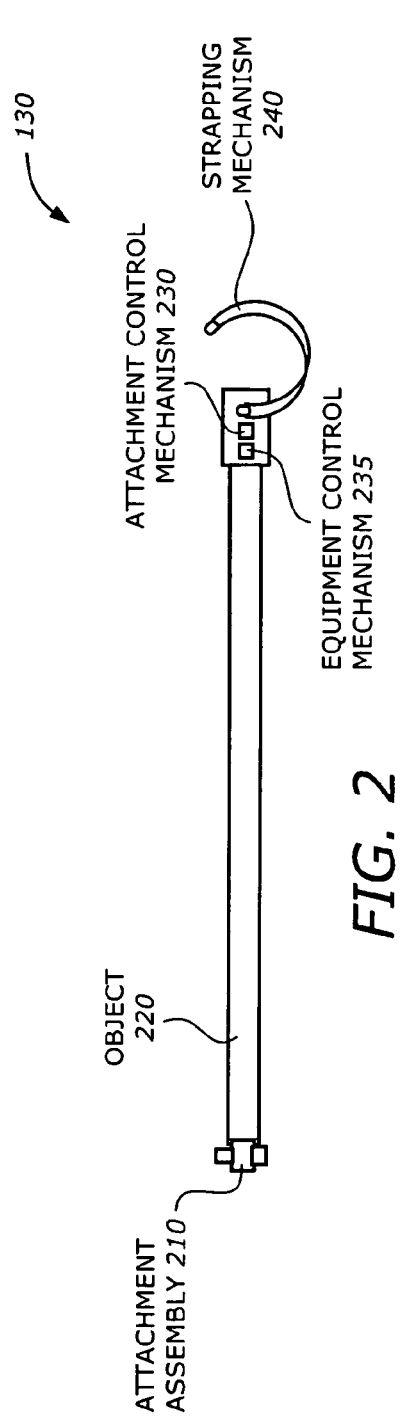
FIG. 2 is a diagram illustrating an equipment accessory according to one embodiment of the invention.

FIG. 2 is a diagram illustrating the holding accessory 130 according to one embodiment of the invention. The holding accessory 130 includes an attachment assembly 210, an object 220, and a strapping mechanism 240. The holding accessory 130 may include more or less components than the above. For example, the strapping mechanism 230 may be optional.

The attachment assembly 210 attaches to the photographic equipment 120. The object 220 is coupled to the attachment assembly 210 to allow a user to control the photographic equipment 120. In one embodiment, the attachment assembly 210 is attached to the equipment 120 through a socket such as a tripod socket at the bottom of the equipment 120.

Figure 4:
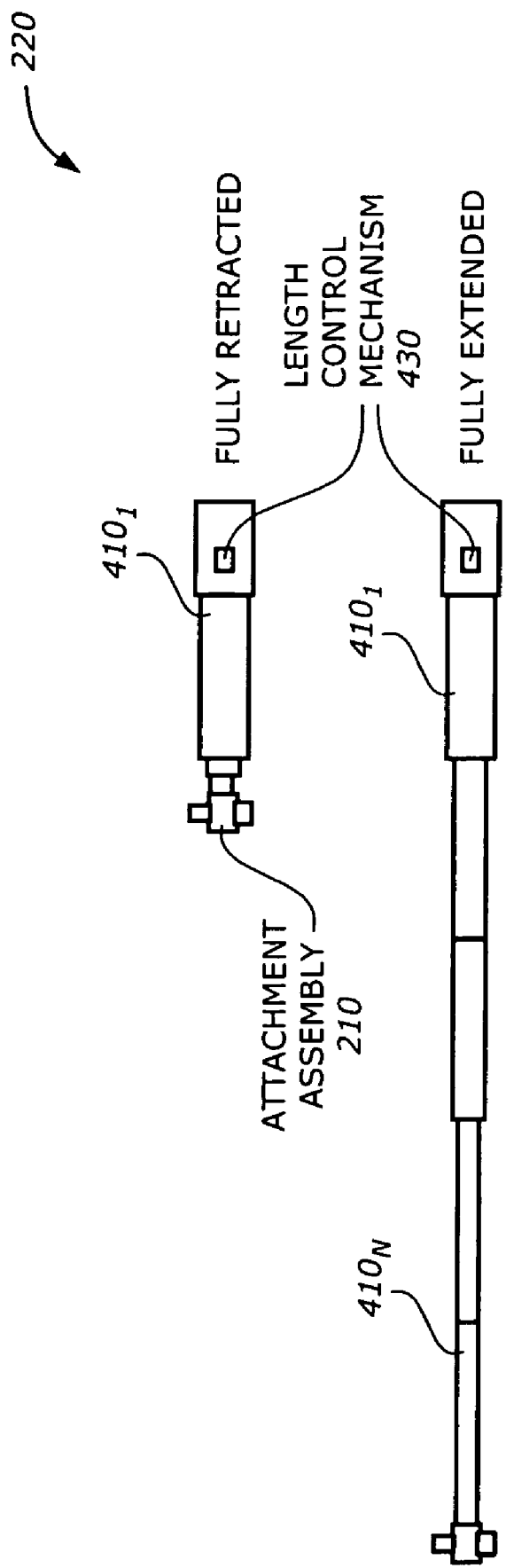
FIG. 4 is a diagram illustrating a multi-piece object according to one embodiment of the invention.
Figure 5:
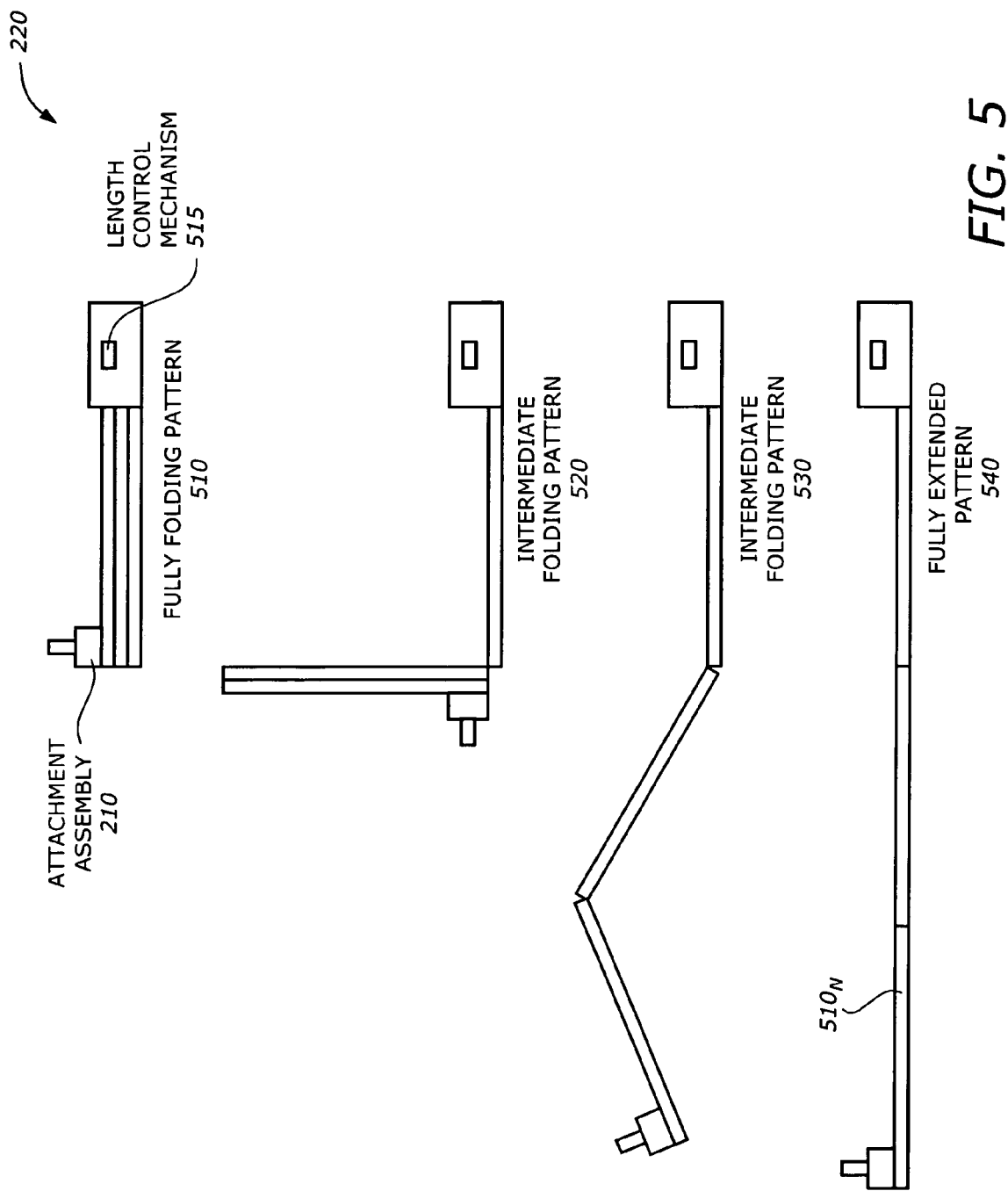
FIG. 5 is a diagram illustrating a foldable multi-piece object according to one embodiment of the invention.
Figure 6:
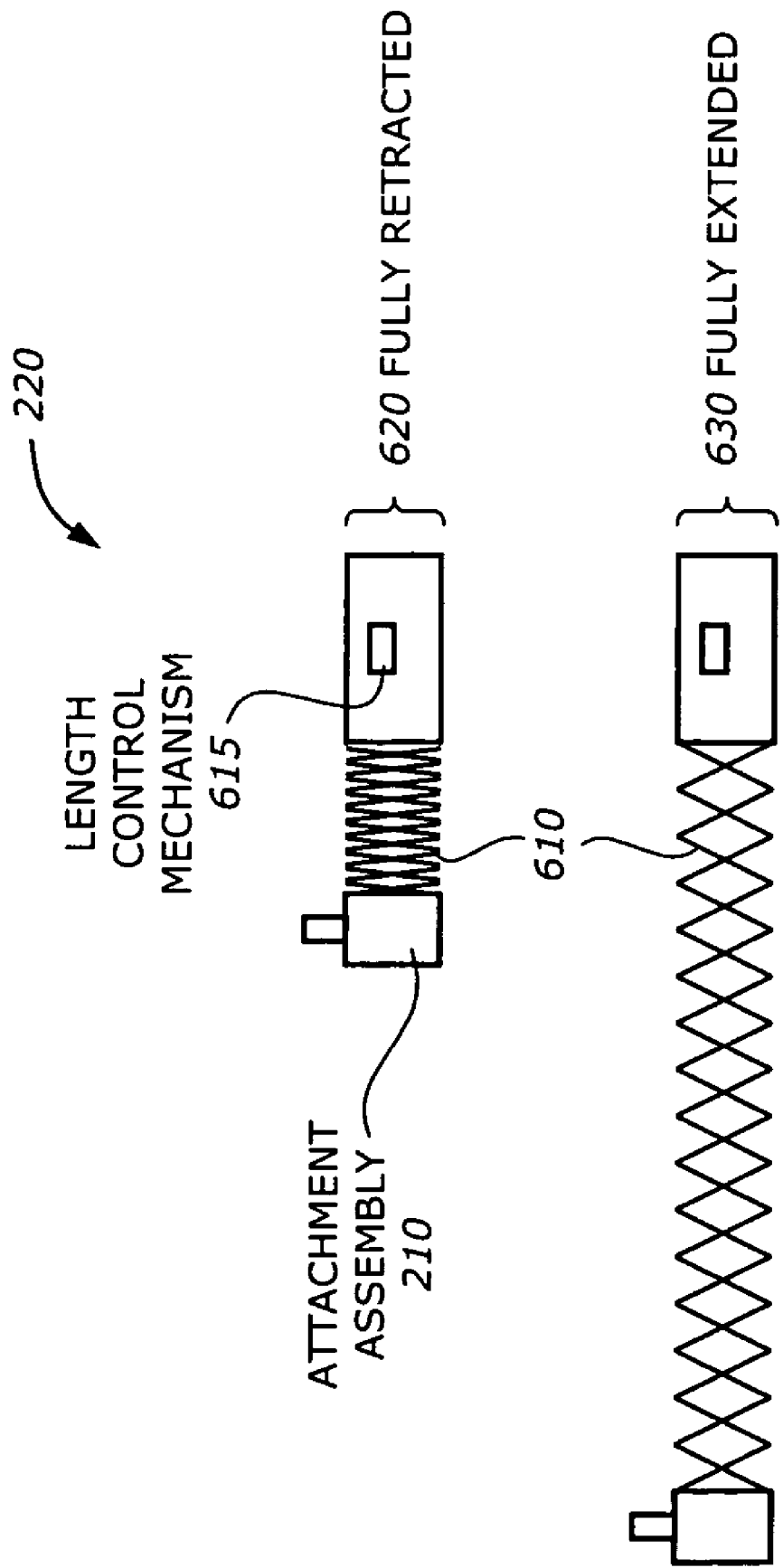
FIG. 6 is a diagram illustrating a spring-like object according to one embodiment of the invention.

The object 220 provides a means for the user 110 to extend the reach of the equipment 120 so that it may be positioned at a distance from, and pointing toward, the user 110 or any location for picture taking or video recording purposes. It may have any suitable shape and configuration. It may be made of any suitable material such as metal, alloy, aluminum, plastic, etc. In general, the object 220 includes a length object which may be a rod-like single piece or may consist of multiple rod-like pieces that can be expanded or contracted to provide a variable length. As a single piece, it has a length sufficiently long to allow the user 110 to adjust distance from the equipment 120 to a viewing area seen from the equipment 120. The object 220 may also include a number of pieces in several configurations as illustrated in FIGS. 4, 5, and 6. The object 220 may include an attachment control mechanism 230 at one end to allow the user 110 to control the movement of the attachment assembly 210. The attachment control mechanism 230 may be a switch, a toggle switch, a joystick, a wheel, a rotational device, a push button, or any other suitable activation mechanism. The attachment control function may be manual, mechanical, optical, electronic, electromagnetic, or electrical. In one embodiment, the object 220 may include an equipment control mechanism 235 to activate an equipment control function that controls the equipment 120 such as taking pictures, recording video images or zoom in/out. The control mechanism 235 may be mechanical, electronic, electromagnetic, or optical. For example, the equipment may be a cell phone with a camera, and the control function may be activated by a wireless command.

The strapping mechanism 240 provides a means to secure the object 220 to the user 110 or a stable support. It may be strapped to the body of the user 110 at the wrist, elbow, arm, hand, neck, waist, shoulder, leg, or any part of the body. It may also be strapped to any other stable support such as a tree, a pole, a post, a residential structure, a part of a building, a part of a vehicle, etc. The strapping mechanism 240 may be a part of the holding accessory 130, or a separate item that can be attached to the object 220.

The attachment control mechanism 230, the equipment control mechanism 235, or the strapping mechanism 240 may be optional. For clarity, these mechanisms are not shown in FIGS. 4, 5, 6, 7, 8, and 9. Furthermore, all the control functions including attachment, equipment, length, or support control mechanisms may be implemented by a manual, mechanical, electrical, electronic, electromagnetic, or optical method. Examples of these mechanisms include pressing a button, activating a motor, forming an electrical connection sending a wireless command, emitting sonar pulses, transmitting a radio frequency (RF) signal, emitting optical pulses, etc.

Figure 3:
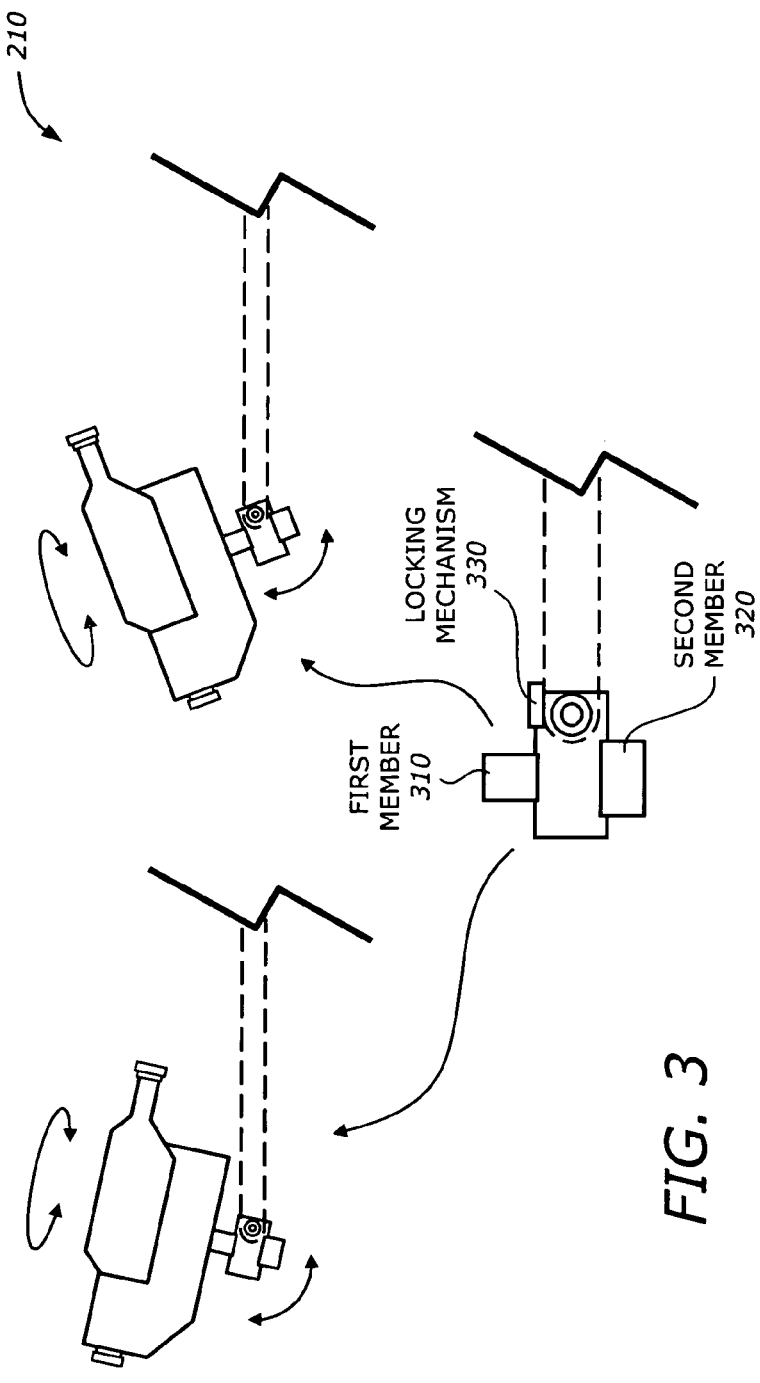
FIG. 3 is a diagram illustrating an attachment assembly according to one embodiment of the invention.

FIG. 3 is a diagram illustrating the attachment assembly 210 according to one embodiment of the invention. The attachment assembly 210 includes a first member 310 and a second member 320.

The first member 310 is adapted to be attached to the equipment 120. In one embodiment, it has threads to be screwed into the adapter socket of the equipment 120. Other means for attaching to the equipment may be used including bracket, clamp, Velcro strap, etc. The first member 310 is adjustable to allow the equipment 120 to be positioned in a desired pointing position. The adjustment may be horizontal, vertical, tilted, rotated, or any desired position adjustment. The adjustment may be manual, mechanical, optical, or electrical. In one embodiment, one or more stepper motors may be used with a gear assembly to move the first member 310 in three dimensions. The control of the movement or adjustment of the first member may be provided by the attachment control mechanism 230 shown in FIG. 2. As discussed above, the attachment control mechanism 230, when activated, may provide a control function such as generating an electrical pulse, forming an electrical connection, sending out a wireless command, emitting an optical signal, closing or opening a switch, etc. This control function is applied to the first member 310 to adjust its movement.

The second member 320 provides a base or platform for the first member 310 to move around. It is attached to the object 220 to secure the first member 310 to the object 220. The second member 320 may optionally include a locking mechanism 330 to lock the first member 310 at a desired pointing position.

In one embodiment, the attachment assembly 210 may be integrated with the photographic equipment 120. The object 220 may be a separate component to be attached to the attachment assembly 210.

FIG. 4 is a diagram illustrating a multi-piece object 220 according to one embodiment of the invention. The multi-piece object 220 includes a number of pieces $410_1$ to $410_N$ and a length control mechanism 430. The object 220 may also include an attachment control mechanism 230 and/or an equipment control mechanism 235 as shown in FIG. 2.

The N pieces $410_1$ to $41_N$ are rod-like pieces or segments that are arranged such that they can be retracted or extended to provide a desired length. The retraction or extension may be partially or fully. The pieces may be tubular and of gradual sizes such that the larger ones may contain the smaller ones when retracted. The action may be mechanical or electrical. The mechanical action may include a spring-like action during extension and manual action during retraction. The electrical action may include stepper motor (s). Any combination of manual, mechanical, optical, or electrical actions may be employed.

The length control mechanism 430 provides a means for the user 110 to activate the retraction or the extension. It may be a switch, a toggle switch, a joystick, a wheel, a rotational device, a push button, or any other suitable activation mechanism. The control function may be mechanical, optical, or electrical. The control function may provide selection to adjust the proper length. For example, each time the button of the mechanism 430 is pressed, the object 220 is extended one piece or segment.

FIG. 5 is a diagram illustrating a foldable multi-piece object 220 according to one embodiment of the invention. The foldable multi-piece object 220 includes N pieces $510_1$ to $510_N$ and a length control mechanism 515. The object 220 may also include an attachment control mechanism 230 and/or an equipment control mechanism 235 as shown in FIG. 2.

The N pieces $510_1$ to $510_N$ are rod-like pieces or segments that are arranged so that they can be folded in any configuration. The pieces are folded to provide a variable length and positioning for the equipment 120. The folding may be performed manually, mechanically, and electrically. Any folding pattern may be provided. For example, the folding pattern 510 shows a fully folded pattern where all the pieces are folded on top of one another. The folding patterns 520 and 530 are patterns that provide intermediate lengths with angular positioning for the attachment assembly 210. The folding pattern 540 provides a linear fully extended pattern for a linear full length.

The length control mechanism 515 provides a means for the user 110 to activate the folding action. It may be a switch, a toggle switch, a joystick, a wheel, a rotational device, a push button, or any other suitable activation mechanism. The control function may be mechanical, optical, or electrical. The folding patterns may be pre-defined and selected by the length control mechanism 515.

FIG. 6 is a diagram illustrating a spring-like object 220 according to one embodiment of the invention. The spring-like object 220 includes a spring-like. segment or segments 610 and a length control mechanism 615. The object 220 may also include an attachment control mechanism 230 and/or an equipment control mechanism 235 as shown in FIG. 2.

The spring-like segment 610 includes a number of pieces formed in a spring configuration. These pieces are extendable or compressible to provide the variable length upon activation of the length control mechanism 615. The action may be manual, mechanical, or electrical.

The length control mechanism 615 provides a means for the user 110 to activate the spring action. It may be a switch, a toggle switch, a joystick, a wheel, a rotational device, a push button, or any other suitable activation mechanism. The control function may be mechanical, optical, or electrical. The spring action provides a fully retracted pattern 620 and a fully extended pattern 630.

Figure 7:
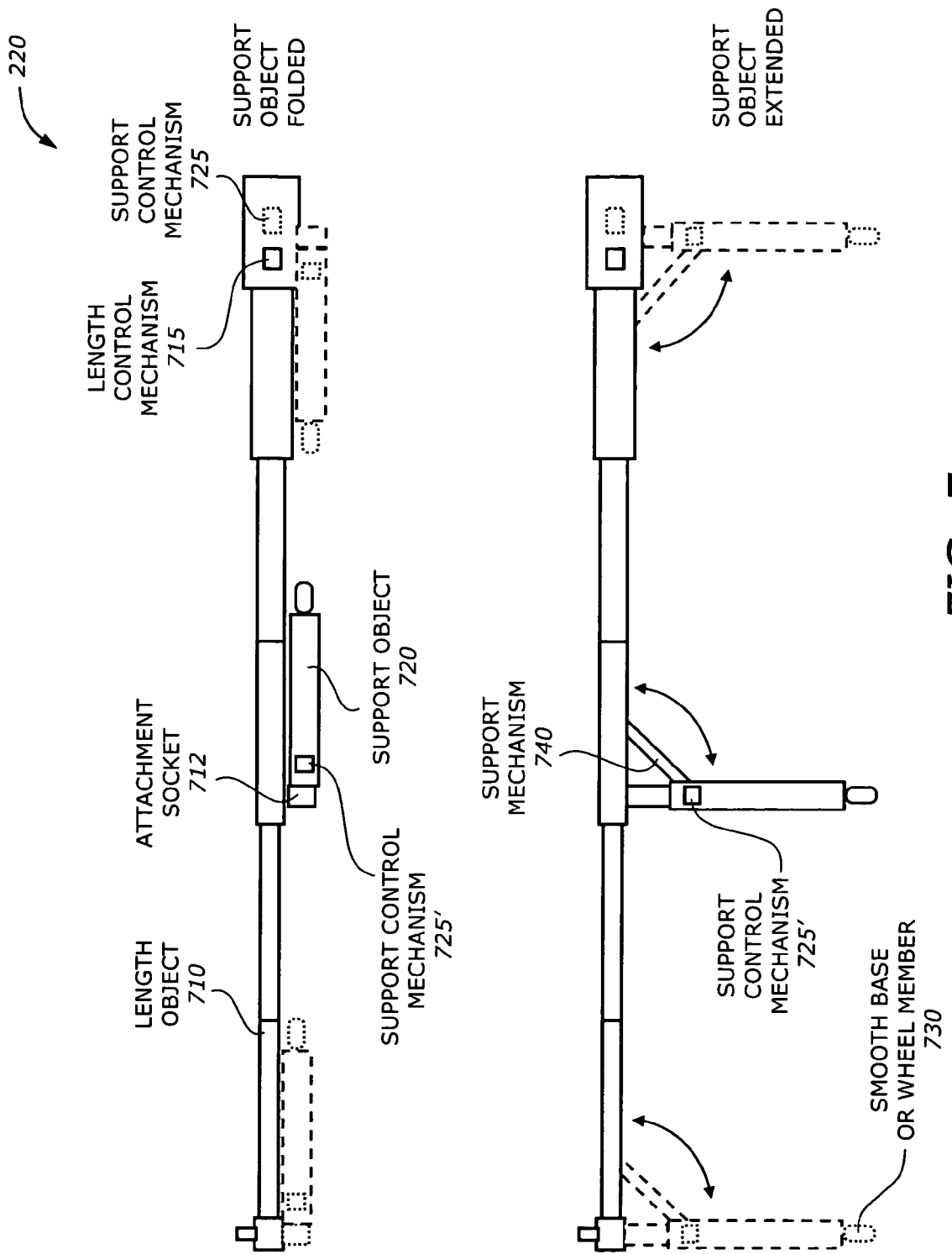
FIG. 7 is a diagram illustrating an object with support according to one embodiment of the invention.

FIG. 7 is a diagram illustrating an object 220 with support according to one embodiment of the invention. The object 220 includes a length object 710, at least a support object 720, a length control mechanism 715, and a support control mechanism 725. The object 220 may also include an attachment control mechanism 230 and/or an equipment control mechanism 235 as shown in FIG. 2.

The length object 710 provides a fixed or variable length as shown in FIGS. 2, 4, 5, and 6. It may include a single piece or a number of pieces. It includes a bracket, socket, or an attachment socket 712 to allow attachment of the support object 720.

The support object 720 is a rod-like piece or object that can be folded along the longitudinal axis of the length object 710 and extended to form an angle with respect to the length object 740. It may be separate from or integrated with the length object 710. The support object 720 is attached to the length object 710 at a first end to provide support to the length object 710 when rested on a surface. There may be multiple support objects 720 that are attached to the length object 710 at various ends. The attachment socket 712 attaches the support object 720 at the first end at any location beneath the length object 710. It may include a supporting mechanism 740 to position the support object 720 at an angle. The support object 720 typically has a smooth base or a wheel member 730 so that the user 110 can drag or roll the length object 710 on a surface with ease and little effort.

The length control mechanism 715 is used to control the length of the length object. The support control mechanism 725 provide control functions to the support object 720, such as folding, extending, releasing wheel, etc. The support control mechanism 725 may be located on one end of the length object 10, or on the support object 720 at location 725'.

Figure 8:
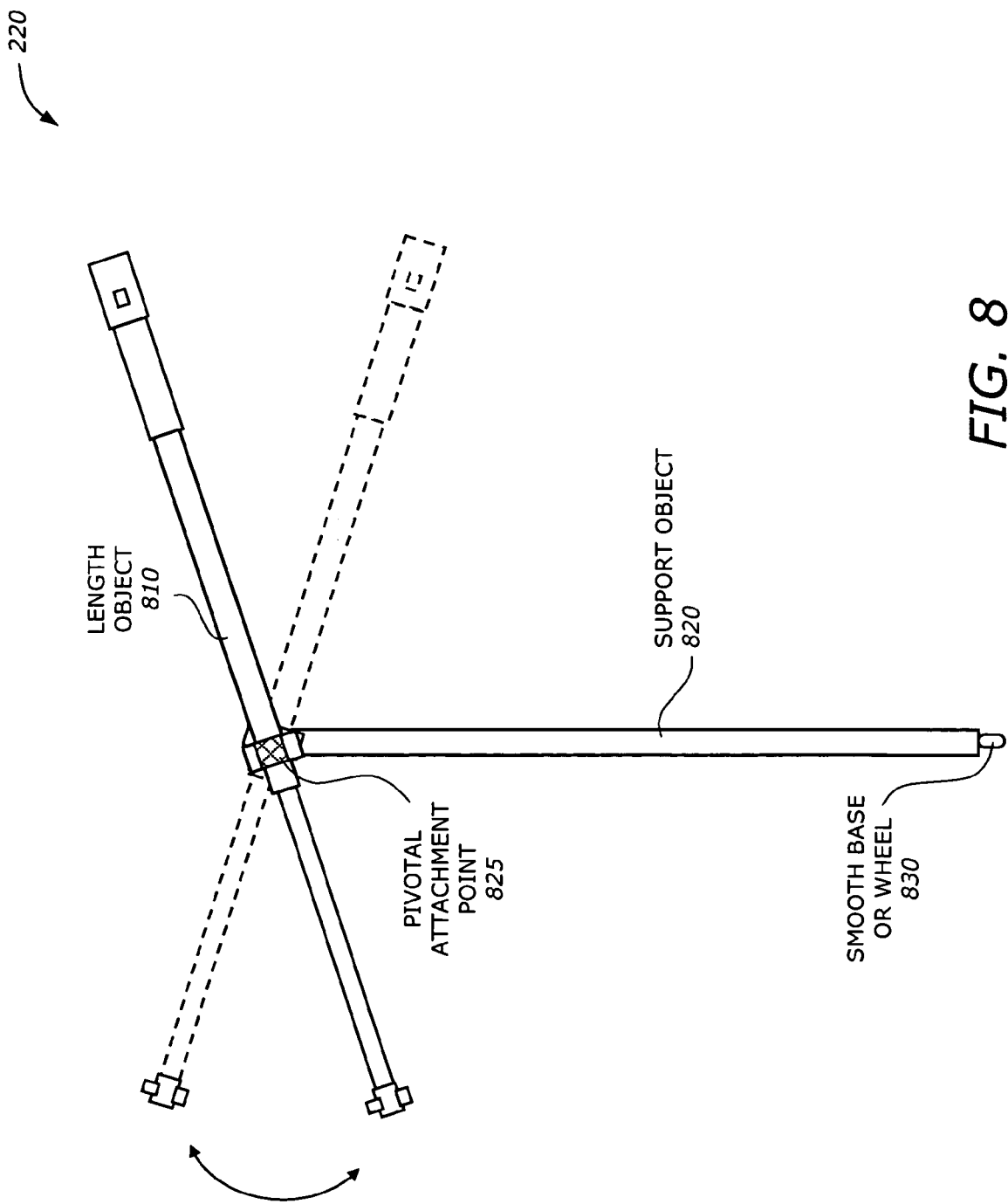
FIG. 8 is a diagram illustrating an object with pivotal support according to one embodiment of the invention.

FIG. 8 is a diagram illustrating an object 220 with a pivotal support object according to one embodiment of the invention. The object 220 includes a length object 810 and a support object 820. The object 220 may also include an attachment control mechanism 230 and/or an equipment control mechanism 235 as shown in FIG. 2 and a length control mechanism as discussed above.

The length object 810 provides a fixed or variable length as shown in FIGS. 2, 4, 5, and 6. It may include a single piece or a number of pieces. It includes a pivotal bracket, socket, or a pivotal attachment socket 825 to allow attachment of the support object 820. The length object 810 may be moved around the pivotal attachment socket 825 in any direction as desired while resting on the support object 820.

The support object 820 is similar to the support object 720 shown in FIG. 7 except that it is attached to the pivotal attachment socket 825 to provide a pivotal support for the length object 810. It includes a smooth base or a wheel member 830 to allow the user to drag or roll the length object 810 on a surface. There may be multiple support objects 820 attached to the length object 810 at the same attachment point or at different attachment locations.

Figure 9:
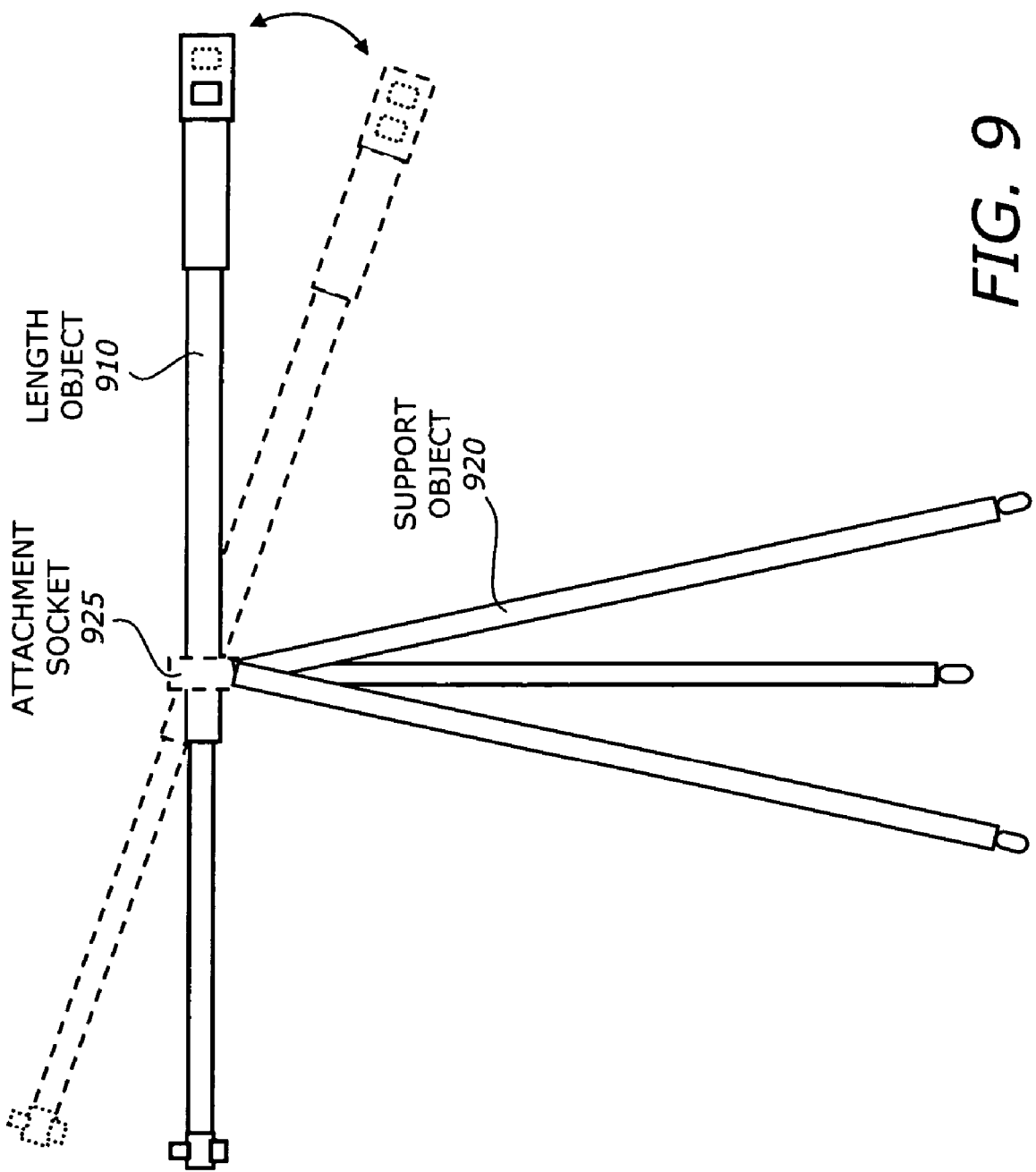
FIG. 9 is a diagram illustrating an object with multi-leg support according to one embodiment of the invention.

FIG. 9 is a diagram illustrating an object 220 with multi-leg support according to one embodiment of the invention. The object 220 includes a length object 910 and a support object 920. The object 220 may also include an attachment control mechanism 230 and/or an equipment control mechanism 235 as shown in FIG. 2 and a length control mechanism as discussed above.

The length object 910 is similar to the length object 810 in FIG. 8. It provides a fixed or variable length as shown in FIGS. 2, 4, 5, and 6. It may include a single piece or a number of pieces. It includes a pivotal bracket, socket, or a pivotal attachment socket 925 to allow attachment of the support object 820. The length object 910 may be moved around the pivotal attachment socket 825 in any direction as desired while resting on the support object 920.

The support object 920 includes a number of legs or rod-like segments. The legs can be spread in any angle to provide stable support for the length object 910. The number of legs may be any desired number. Each leg may be individually adjusted to provide variable length, especially when resting on uneven surface. In addition, each leg may have a smooth base or a wheel member to allow the user to drag or roll the length object 910 with ease or little effort on a surface.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    an attachment assembly to attach to a photographic equipment; and an object coupled to the attachment assembly at a first end, the object having a length control mechanism at a second end to allow a user to adjust length between the first end and the second end and to control movement of the photographic equipment.

2. The apparatus of claim 1 further comprising:
a strapping mechanism attached to the object to strap the object to the user or a stable support.

3. The apparatus or claim 1 wherein the attachment assembly comprises:
a first member adapted to be attached to the equipment, the first member being adjustable to allow the equipment to be positioned in a desired pointing position; and
a second member attached to the first member to secure the first member to the object.

4. The apparatus of claim 3 wherein the attachment assembly further comprises:
a locking mechanism to lock the first member at the desired pointing position.

5. The apparatus of claim 1 wherein the object comprises:
an attachment control mechanism to allow the user to control movement of the attachment assembly, the attachment control mechanism being mechanical or electrical.

6. The apparatus of claim 1 wherein the object comprises:
a length object comprising a single piece having a length sufficiently long to allow the user to adjust distance from the equipment to a viewing area seen from the equipment.

7. The apparatus of claim 1 wherein the object comprises:
a length object comprising a plurality of pieces that are movable to provide a variable length to the object.

8. The apparatus of claim 7 wherein the length control mechanism is located at one of the pieces to allow the user to control movement of the pieces, the length control mechanism being mechanical, optical, or electrical.

9. The apparatus of claim 7 wherein the length object comprises:
a plurality of rod-like pieces that are foldable to a predetermined shape.

10. The apparatus of claim 8 wherein the length object comprises:
at least a spring-like piece that is extendable or compressible to provide the variable length upon activation of the length control mechanism.

11. The apparatus of claim 6 wherein the object further comprises:
a support object attached to the length object at a first end to provide support to the length object when rested on a surface.

12. The apparatus of claim 7 wherein the object further comprises:
a support object attached to the length object at a first end to provide support to the length object when rested on a surface.

13. The apparatus of claim 12 wherein the support object comprises:
a rod-like piece that is foldable to form an angle with respect to the first object.

14. The apparatus of claim 13 wherein the support object further comprises:
a supporting mechanism attached to the length object to position the rod-like piece at the angle.

15. The apparatus of claim 12 wherein the support object further comprises:
a wheel member attached to a second end of the support object to allow the user to roll the first object on the surface.

16. The apparatus of claim 13 wherein the length object comprises:
a support control mechanism to control folding of the rod-like piece, the support control mechanism being mechanical, optical, or electrical.

17. The apparatus of claim 12 wherein the length object comprises:
a pivotal attachment member attached to the support object to allow the user to move the length object pivotably around the first end.

18. The apparatus of claim 5 wherein the attachment control mechanism controls adjustment of the first member.

19. The apparatus of claim 12 wherein the support object comprises:
a plurality of legs attached to the length object to allow the user to move the length object pivotably around the first end.

20. The apparatus of claim 1 wherein the photographic equipment comprises:
at least one of a still camera, a camcorder, and a video recorder.

21. An equipment comprising:
a photographic device; and
an accessory assembly attached to the photographic device, the accessory assembly comprising:
an attachment assembly to attach to a photographic equipment, and an object coupled to the attachment assembly at a first end, the object having a length control mechanism at a second end to allow a user to adjust length between the first end and the second end and to control movement of the photographic device.

22. The equipment of claim 21 wherein the accessory assembly further comprises:
a strapping mechanism attached to the object to strap the object to the user or a stable support.

23. The equipment of claim 21 wherein the attachment assembly comprises:
a first member adapted to be attached to the equipment, the first member being adjustable to allow the equipment to be positioned in a desired pointing position; and
a second member attached to the first member to secure the first member to the object.

24. The equipment of claim 23 wherein the attachment assembly further comprises:
a locking mechanism to lock the first member at the desired pointing position.

25. The equipment of claim 21 wherein the object comprises:
an attachment control mechanism to allow the user to control movement of the attachment assembly, the attachment control mechanism being mechanical or electrical.

26. The equipment of claim 21 wherein the object comprises:
a length object comprising a single piece having a length sufficiently long to allow the user to adjust distance from the equipment to a viewing area seen from the equipment.

27. The equipment of claim 21 wherein the object comprises:
a length object comprising a plurality of pieces that are movable to provide a variable length to the object.

28. The equipment of claim 27 wherein the length control mechanism is located at one of the pieces to allow the user to control movement of the pieces, the length control mechanism being mechanical, optical, or electrical.

29. The equipment of claim 27 wherein the length object comprises:
a plurality of rod-like pieces that are foldable to a predetermined shape.

30. The equipment of claim 28 wherein the length object comprises:
at least a spring-like piece that is extendable or compressible to provide the variable length upon activation of the length control mechanism.

31. The equipment of claim 26 wherein the object further comprises:
a support object attached to the length object at a first end to provide support to the length object when rested on a surface.

32. The equipment of claim 27 wherein the object further comprises:
a support object attached to the length object at a first end to provide support to the length object when rested on a surface.

33. The equipment of claim 32 wherein the support object comprises:
a rod-like piece that is foldable to form an angle with respect to the first object.

34. The equipment of claim 33 wherein the support object further comprises:
a supporting mechanism attached to the length object to position the rod-like piece at the angle.

35. The equipment of claim 32 wherein the support object further comprises:
a wheel member attached to a second end of the support object to allow the user to roll the first object on the surface.

36. The equipment of claim 33 wherein the length object comprises:
a support control mechanism to control folding of the rod-like piece, the support control mechanism being mechanical, optical, or electrical.

37. The equipment of claim 32 wherein the length object comprises:
a pivotal attachment member attached to the support object to allow the user to move the length object pivotably around the first end.

38. The equipment of claim 25 wherein the attachment control mechanism controls adjustment of the first member.

39. The equipment of claim 32 wherein the support object comprises:
a plurality of legs attached to the length object to allow the user to move the length object pivotably around the first end.

40. The equipment of claim 21 wherein the photographic device comprises:
at least one of a still camera, a camcorder, and a video recorder.

* * * * *